United States Patent
Kawamata et al.

(10) Patent No.: US 6,251,509 B1
(45) Date of Patent: *Jun. 26, 2001

(54) MAGNETIC TAPE

(75) Inventors: Toshio Kawamata; Toshiyuki Kitahara; Minoru Sueki, all of Kanagawa (JP)

(73) Assignee: Fuji Photo Film Co., Ltd., Kanagawa (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/255,721

(22) Filed: Feb. 23, 1999

(30) Foreign Application Priority Data

Feb. 23, 1998 (JP) .................................................. 10-057505

(51) Int. Cl.[7] ...................................................... G11B 5/706

(52) U.S. Cl. ........................... 428/216; 428/328; 428/329; 428/336; 428/694 BS; 428/694 BB; 428/900

(58) Field of Search ...................................... 428/216, 328, 428/329, 336, 694 BS, 694 BB, 900

(56) References Cited

U.S. PATENT DOCUMENTS

| | | | | |
|---|---|---|---|---|
| 5,804,283 | * | 9/1998 | Inaba et al. | 428/141 |
| 5,876,833 | * | 3/1999 | Suzuki et al. | 428/141 |

* cited by examiner

Primary Examiner—Stevan A. Resan
(74) Attorney, Agent, or Firm—Sughrue, Mion, Zinn, Macpeak & Seas, PLLC

(57) ABSTRACT

A magnetic tape favorably employable for recording computer data has a support, and on one side of the support, a essentially non-magnetic layer composed of a non-magnetic powder and a binder, and a magnetic layer composed of a ferromagnetic powder and a binder superposed in order, and on the other side, a back-coating layer containing carbon black, wherein the magnetic layer has a thickness of 0.08 to 0.28 μm and a magnetic flux of 0.02 to 0.1 G·cm.

6 Claims, No Drawings

MAGNETIC TAPE

FIELD OF THE INVENTION

This invention relates to a magnetic tape advantageously employable for recording computer data. In particular, the invention relates to a magnetic tape advantageously employable for a magnetic recording-reproducing system equipped with a magnetoresistive reproducing head (MR head).

BACKGROUND OF THE INVENTION

Recently, in magnetic recording-reproducing systems for computer data, thin-film magnetic heads have been practically used. Since the thin-film magnetic heads can be easily down-sized and applied to multi-track heads, they are widely used for multi-track linear recording systems, particularly, employing magnetic tapes as computer data recording media. The down-sized thin-film magnetic head is of value for increasing the track density to improve the recording efficiency, and consequently enables the magnetic tape to record the data in an increased density. Further, the multi-tracking system can increase the data transfer rate.

The thin-film magnetic heads are roughly categorized into two types, namely, magnetic inductive head (which responds to time-dependent variation of magnetic flux) and magnetoresistive head (which responds to scale of magnetic flux). Since the inductive head generally has a flat structure, its head coil consists of a relatively small number of turns. Accordingly, the inductive head can not give large magnetism, and hence it hardly gives high reproduction output. For this reason, the magneto-resistive head (MR head) giving high output power is used for reproduction, while the inductive head is used as a recording head. Those magnetic heads are generally incorporated in a unified system in which the linear recording method is adopted to perform rapid data transfer.

The specification of a magnetic tape for computer data recording is specifically determined according to the magnetic recording-reproducing system equipped with a MR head. For example, magnetic tapes to be used in IBM systems of 3480, 3490, 3590 and 3570 are known and commercially available. Each of those magnetic tapes has a basic structure in which a single thick magnetic layer (thickness: approx. 2.0 to 3.0 $\mu$m) comprising a ferromagnetic powder and a binder is provided on a flexible support. In general, in order to ensure good running durability and to inhibit wrong winding, the magnetic tape for computer data recording further comprises a back-coating layer on the reverse side (i.e., side on which the magnetic layer is not provided) of the support.

It is a problem that the magnetic tape having the single thick magnetic layer can not store a great deal of data. To solve this problem, a magnetic tape having a upper magnetic layer and a lower essentially non-magnetic layer is proposed [Japanese patent provisional Publication No. 8(1996)-227517, which corresponds to Y. Kakuishi et al., U.S. patent application Ser. No. 08/602,567 filed Feb. 14, 1996]. In the proposed tape, a lower non-magnetic layer comprising a non-magnetic inorganic powder dispersed in a binder and an upper magnetic layer comprising a ferromagnetic powder dispersed in a binder are superposed and provided on a non-magnetic support. Since the upper magnetic layer can be made thin, output depression caused by thickness loss can be avoided in the proposed tape. Further, since the data recording density can be increased, the magnetic tape having the upper magnetic layer and the lower non-magnetic layer can store the computer data much more than that having the single thick magnetic layer. According to the above-identified publication, the upper magnetic layer has a thickness of 0.05 to 1.0 $\mu$m, preferably 0.05 to 0.8 $\mu$m. The magnetic tape for computer data recording described in the publication comprises a support of polyethylene terephthalate (thickness: 10 $\mu$m). On one side of the support, a non-magnetic layer (thickness: 2.7 $\mu$m) and a magnetic layer (thickness: 0.3 $\mu$m) are superposed in this order. The magnetic layer contains a ferromagnetic metal powder having a coercive force (Hc) of 1,800 Oe.

The inventors have studied about adaptability of magnetic tapes to MR heads which is incorporated in the magnetic recording-reproducing systems, and found that the known magnetic tapes such as the above-described tapes are not satisfactory suitable for the system equipped with the MR head, particularly, for recording computer data. A further study of the inventors has revealed the following facts.

When the magnetic tape having a relatively thick magnetic layer (thickness: 0.3 $\mu$m) is applied to the system, the reproduced output power is often so high that it saturates the MR head since the magnetic layer has a strong magnetic flux. The saturated MR head reproduces signals in distorted waveforms, and consequently gives an insufficient S/N value to increase the error rate. Further, although a high recording density is generally given by a sharp reproduction waveform (i.e., solitary reproduced inverse waveform) having a small half width, the thick magnetic layer enlarges the half width to lower the recording density. On the other hand, a magnetic tape having a very thin magnetic layer (thickness: 0.05 $\mu$m) also distorts the reproduced waveform to give an insufficient S/N value. Further, the thin magnetic layer often lowers the reproduction output power.

It is an object of the present invention to provide a magnetic tape which can be applied to magnetic recording-reproducing system with a magnetoresistive reproducing head (MR head) suitable to exhibit excellent electromagnetic characteristics. In more detail, the magnetic tape to be provided by the invention should cause few errors, accomplish a rapid data transfer rate, and record data of high densely when it is employed in a magnetic recording-reproducing system equipped with a magneto-resistive reproducing head.

SUMMARY OF THE INVENTION

As a result of further studies, it has been revealed that an excellent S/N value and a high recording density can be accomplished by both making the magnetic layer thin enough for the MR head to reproduce the data in a moderate output power, and setting the magnetic flux of the magnetic layer in an appropriate range so as not to saturate the MR head.

The present invention resides in a magnetic tape comprising a support, and on one side of the support, an essentially non-magnetic layer comprising a non-magnetic powder and a binder, and a magnetic layer comprising a ferromagnetic powder and a binder superposed in order, and on the other side, a back-coating layer containing carbon black, wherein the magnetic layer has a thickness in the range of 0.08 to 0.28 $\mu$m and a magnetic flux in the range of 0.02 to 0.1 G·cm.

The preferred embodiments of the invention are as follows.

(1) The magnetic layer has a magnetic flux ($\Phi$m) of 0.02 to 0.095 G·cm, more preferably 0.05 to 0.093 G·cm, and most preferably 0.05 to 0.092 G·cm.

(2) The magnetic layer has a thickness of 0.1 to 0.28 $\mu$m, more preferably 0.1 to 0.25 $\mu$m.

(3) The ferromagnetic powder has a coercive force (Hc) of 1,680 to 2,050 Oe, and more preferably 1,700 to 2,000 Oe.

(4) The magnetic layer comprises the ferromagnetic powder in an amount of 75 to 85 wt. % (more preferably 78 to 82 wt. %) based on that of the solid content.

(5) The magnetic layer has a switching field distribution (SFD) value of 0.1 to 0.32 (more preferably 0.15 to 0.28, and most preferably 0.18 to 2.5).

(6) The magnetic layer has a squareness ratio (SQ) of not less than 0.82 (more preferably not less than 0.85, and most preferably not less than 0.88) in its longitudinal direction.

(7) The total thickness of the magnetic tape is in the range of 5 to 10 $\mu$m (more preferably 7 to 9.5 $\mu$m, and most preferably 7.5 to 9.5 $\mu$m).

(8) The carbon black comprises a combination of two kinds of carbon blacks having different mean particle sizes. One carbon black consists of relatively fine particles having a mean particle size of 10 to 30 m$\mu$, and the other consists of relatively large particles having a mean particle size of 150 to 300 m$\mu$.

(9) The back-coating layer further contains an inorganic material powder having Mohs' scale of hardness of 5 to 9.

(10) The inorganic material powder of the above (9) has a mean particle size of 0.05 to 1 $\mu$m (more preferably 0.08 to 0.5 $\mu$m, and most preferably 0.08 to 0.3 m$\mu$).

(11) The inorganic material powder of the above (9) is $\alpha$-alumina.

(12) The back-coating layer has a thickness of 0.2 to 0.8 $\mu$m.

(13) The magnetic tape is designed for a magnetic recording-reproducing system employing a magnetoresistive reproducing head.

(14) The magnetic tape is designed for multi-tracks linear recording system.

DETAILED DESCRIPTION OF THE INVENTION

The magnetic tape of the invention comprises a support, and on one side of the support, an essentially non-magnetic layer comprising a non-magnetic powder and a binder, and a magnetic layer comprising a ferromagnetic powder and a binder superposed in order, and on the other side, a back-coating layer containing carbon black. The invention is characterized by the magnetic layer having a thickness of 0.08 to 0.28 $\mu$m and a magnetic flux of 0.02 to 0.1 G·cm. In a preferred embodiment, the magnetic layer has a thickness of 0.1 to 0.28 $\mu$m, and more preferably 0.1 to 0.25 $\mu$m. The magnetic flux ($\Phi$m) of the magnetic layer is preferably in the range of 0.02 to 0.095 G·cm, more preferably 0.05 to 0.093 G·cm, and most preferably 0.05 to 0.092 G·cm.

Each component of the magnetic tape of the invention is explained below in order.

First, the magnetic layer is described in detail.

There is no restriction with respect to the method for setting the magnetic flux of the magnetic layer in the range of 0.02 to 0.1 G·cm. Examples of the methods include: (1) a method in which the magnetic layer is made to have a relatively thin thickness, (2) a method in which a material having a proper coercive force is employed as the ferromagnetic powder, and (3) a method in which the ferromagnetic powder is incorporated into the magnetic layer in a proper content (in a proper charge density). These methods may be optionally used in combination.

The thickness of the magnetic layer is in the range of 0.08 to 0.28 $\mu$m. The magnetic layer having a thickness out of this range gives a reproduced waveform having a large half width, and hence hardly accomplishes a sufficient recording density even if the magnetic flux satisfies the condition of the invention.

The larger coercive force the ferromagnetic powder has, the higher recording density the magnetic layer can be given. However, in order to gain a high recording density, a large recording current is also required. Although a large recording current gives a high output power, the MR head is liable to be saturated. Further, in such case, the recording head often exhibits heat to deteriorate the MR head (which is combined with the recording head), and consequently low output power and a poor S/N value are given. In consideration of these problems, the ferromagnetic powder preferably has a coercive force of 1,680 to 2,050 Oe and more preferably 1,700 to 2,000 Oe, and the magnetic layer preferably contains the ferromagnetic powder in the amount of 75 to 85 wt. %, and more preferably 78 to 82 wt. % based on that of the solid content.

The magnetic layer comprises a ferromagnetic powder and a binder, and can further contain a lubricant, an electroconductive powder (e.g., carbon black) and an abrasive.

Examples of the ferromagnetic powders include ferromagnetic iron oxide $FeO_x$ (x=1.33 to 1.5), $FeO_x$ modified with Co (x=1.33 to 1.5), a ferromagnetic alloy (metal) powder mainly comprising Fe, Ni or Co (in an amount of not less than 75%), and tabular hexagonal ferrite powder. The ferromagnetic alloy powder is particularly preferred.

Besides the above elements, the ferromagnetic powder may further contain at least one element selected from the group consisting of Al, Si, S, Sc, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, and B.

The ferromagnetic powder may be treated with various auxiliary agents (e.g., dispersants, lubricants, surface active agents, and antistatic agents) before it is dispersed in a binder. The treatments can be carried out in the manners described in, for example, Japanese Patent Publications No. 44(1969)-14090, No. 45(1970)-18372, No. 47(1972)-22062, No. 47(1972)-22513, No. 46(1971)-28466, No. 46(1971)-38755, No. 47(1972)-4286, No. 47(1972)-12422, No. 47(1972)-17284, No. 47(1972)-18509, No. 47(1972)-18573, No. 39(1964)-10307 and No. 48(1973)-39639, and U.S. Pat. No. 3,026,215, No. 3,031,341, No. 3,100,194, No. 3,242,005 and No. 3,389,014. Further, the ferromagnetic alloy powder may contain hydroxides or oxides in a very small amount.

The ferromagnetic alloy powder preferably has a specific surface area of 30 to 70 m$^2$/g, and a crystallite size of 50 to 300 angstroms (which is determined by X-ray diffraction method). If the specific surface area is too small, the magnetic tape can not record data under highly dense condition. On the other hand, since the powder having a too large specific surface area is not dispersed uniformly, the magnetic layer containing such powder can not have a smooth surface enough to record the data in a high density.

It is necessary for the ferromagnetic powder to comprise Fe. The powder mainly comprises Fe—Co, Fe—Ni, Fe—Zn—Ni or Fe—Ni—Co, or may comprise Fe alone. In order to ensure high density recording, the powder preferably has a saturation magnetization (saturation magnetic flux density: as) of not less than 110 emu/g (more preferably 120 to 170 emu/g), as well as a coercive force (Hc) in the afore-mentioned range. The powder has a major axis length (i.e., mean particle size) of less than 0.5 μm (preferably 0.01 to 0.3 μm), and an axis ratio (ratio of major axis length/minor axis length; i.e., aspect ratio) of 5 to 20 (preferably 5 to 15). In order to improve the required characteristics, the powder may contain various additives such as semimetal or non-metal elements (e.g., B, C, Al, Si, P) and their salts or oxides. Generally, the particle surface of the powder is covered with an oxide layer for chemical stabilization.

The tabular hexagonal ferrite employable as the ferromagnetic powder is a tabular ferromagnet having an easy axis of magnetization perpendicular to the tabular plane. Examples of the ferrites include barium ferrite (magnetoplumbite, or magnetoplumbite partially including spinel phase), strontium ferrite (magnetoplumbite, or magnetoplumbite partially including spinel phase), lead ferrite, calcium ferrite, and their cobalt-substituted ferrites. Barium ferrite substituted with cobalt and strontium ferrite substituted with cobalt are preferred. The ferrite may optionally contain Co—Ti, Co—Ti—Zr, Co—Ti—Zn, Ni—Ti—Zn or Ir—Zn for adjusting the magnetic resistance. The average particle size of the tabular hexagonal ferrite powder indicates an average width of the tabular hexagonal particles (which can be measured by means of an electron microscope), and preferably is in the range of 0.001 to 1.0 μm. The tabular ratio (particle width/particle thickness) and the specific surface area are preferably in the ranges of 2 to 20 and 1 to 60 m$^2$/g, respectively.

For the same reason as in the ferromagnetic alloy powder described above, the ferrite powder preferably has a moderate particle size so as to give a high density recording. In order to ensure high density recording, the ferrite powder preferably has a saturation magnetization (saturation magnetic flux density: σs) of not less than 50 emu/g (more preferably not less than 53 emu/g), as well as a coercive force (Hc) in the above-mentioned specific range.

The ferromagnetic powder preferably contains water in an amount of 0.01 to 2 wt. %, and the water content is preferably adjusted in view of the nature of the binder (resin). Further, the pH value of ferromagnetic powder is also preferably adjusted in view of the nature of binder (resin), and generally is in the range of 4 to 12 (preferably 5 to 10). The powder may be optionally treated with to cover at least a part of its surface to form oxides of Al, Si, P or Y, and the amount of oxide as calculated with Al, Si, P or Y atom generally is in an amount of 0.1 to 10 wt. % based on that of the powder. The powder subjected to the surface treatment adsorbs a lubricant (such as a fatty acid) in an amount of not more than 100 mg/m$^2$. Occasionally, the ferromagnetic powder contains water-soluble inorganic ions (e.g., ions of Na, Ca, Fe, Ni and Sr). Even in such cases, if the content of the inorganic ions is not more than 5000 ppm, the ions do not affect the characteristics of the powder. The ferromagnetic powders and their preparation methods are described in, for example, Japanese Patent Provisional Publication No. 7(1995)-22224.

The carbon black can be generally incorporated into the magnetic layer so as to ensure a low surface electric resistance (Rs), a small kinetic friction coefficient ($\mu_k$ value), good running endurance, and surface smoothness. The carbon black preferably has a mean particle size of 5 to 350 mμ (more preferably 10 to 300 mμ), and a specific surface area of 5 to 500 m$^2$/g (more preferably 50 to 300 m$^2$/g). Further, the carbon black preferably shows a DBP (dibutyl phthalate) oil absorption in the range of 10 to 1000 mL/100 g (more preferably 50 to 300 mL/100 g), pH of 2 to 10, a water content of 0.1 to 10%, and a tap density of 0.1 to 1 g/cc.

The carbon black can be those produced by various processes. For instance, any of furnace black, thermal black, acetylene black, channel black and lamp black can be employed. Examples of commercially available carbon blacks include BLACKPEARLS 2000, 1300, 1000, 900, 800, 700, and VULCAN XC-72 [trade names, available from Cabot Corp.]; #35, #50, #55, #60 and #80 [trade names, available from Asahi Chemical Industry Co., Ltd.]; #3950B, #3750B, #3250B, #2400B, #2300B, #1000, #900, #40, #30 and #10B [trade names, available from Mitsubishi Chemicals Co., Ltd.]; CONDUCTEX SC, RAVEN, 150, 50, 40 and 15 [trade names, available from Columbia Carbon Corp.]; and KETCHEN BLACK EC, KETCHEN BLACK ECDJ-500 and KETCHEN BLACK ECDJ-600 [trade names, available from LION AGUZO Co., Ltd.]. The carbon black can be generally incorporated in an amount of 0.1 to 30 weight parts, preferably 0.2 to 15 weight parts, based on 100 weight parts of the ferromagnetic powder.

Examples of the abrasives include melted alumina, α-alumina, silicon carbide, chromium oxide ($Cr_2O_3$), corundum, artificial corundum, diamond including natural and synthetic ones, garnet, and emery (main components: corundum and magnetite). The abrasive generally has a Mohs' scale of hardness of not less than 5 (preferably not less than 6, more preferably not less than 8), and preferably has a mean particle size of 0.05 to 1 μm, more preferably 0.2 to 0.8 μm. Into the magnetic layer, the abrasive can be generally incorporated in an amount of 3 to 25 weight parts, more preferably 3 to 20 weight parts, based on 100 weight parts of the ferromagnetic powder.

A lubricant can be incorporated into the magnetic layer. The incorporated lubricant comes out onto the surface of the layer, and reduces friction to maintain smooth contact between the surface of the magnetic layer and a magnetic head. As the lubricant, for example, fatty acids and fatty acid esters are employed. Examples of the fatty acids include acetic acid, propionic acid, 2-ethylhexanic acid, lauric acid, myristic acid, palmitic acid, stearic acid, behenic acid, arachic acid, oleic acid, elaidic acid, linolic acid, linolenic acid, palmitoleic acid and mixtures of them. Examples of the fatty acid esters include butyl stearate, sec-butyl stearate, isopropyl stearate, butyl oleate, amyl stearate, 3-methylbutyl stearate, 2-ethylhexyl stearate, 2-hexyldecyl stearate, butyl palpitate, 2-ethylhexyl myristate, a mixture of butyl stearate and butyl palmitate, oleyl oleate, butoxyethyl stearate, 2-butoxy-1-propyl stearate, dipropyleneglycol monobutyl ether acylated with stearic acid, diethyleneglycol dipalmitate, diol derived from hexamethylnediol by acylating with myristic acid, and glycerol oleate. The above fatty acids and fatty acid esters may be employed singly or in combination. The lubricant can be generally incorporated into the magnetic layer in an amount of 0.2 to 20 weight parts, preferably 0.5 to 10 weight parts, based on 100 weight parts of the ferromagnetic powder.

The binder employed for the magnetic layer is, for example, thermoplastic resin, thermosetting resin, reactive resin, or mixture of them. Examples of the thermoplastic resins include homopolymers or copolymers of vinyl chloride, vinyl acetate, vinyl alcohol, maleic acid, acrylic acid, acrylic ester, vinylidene chloride, acrylonitrile, methacrylic acid, methacrylic ester, styrene, butadiene, ethylene, vinyl butyral, vinyl acetal, and vinyl ether. Concrete examples of the copolymers include vinyl chloride-vinyl acetate copolymer, vinyl chloride-vinylidene chloride copolymer, vinyl chloride-acrylonitrile copolymer, acrylic ester-acrylonitrile copolymer, acrylic ester-vinylidene chloride copolymer, acrylic ester-styrene copolymer, methacrylic ester-acrylonitrile copolymer, methacrylic ester-vinylidene chloride copolymer, methacrylic ester-styrene copolymer, vinylidene chloride-acrylonitrile copolymer, butadiene-acrylonitrile copolymer, styrene-butadiene copolymer, and chlorovinyl ether-acrylic ester copolymer.

The examples of the thermoplastic resin further include polyamide resin, fiber resin (e.g., cellulose acetate butyrate, cellulose diacetate, cellulose propionate, nitrocellulose), polyvinyl fluoride, polyester or polyurethane and various rubber resin.

Examples of the thermosetting resins and the reactive resins include phenol resin, epoxy resin, polyurethane setting resin, urea resin, melamine resin, alkyd resin, acrylic reactive resin, formaldehyde resin, silicone resin, epoxy-polyamide resin, a mixture of polyester resin and polyisocyanate prepolymer, a mixture of polyester polyol and polyisocyanate, and a mixture of polyurethane and polyisocyanate.

Examples of the polyisocyanates include tolylene diisocyanate, 4,4'-diphenylmethane diisocyanate, hexamethylene diisocyanate, xylylene diisocyanate, naphthylene 1,5-diisocyanate, o-toluidine diisocyanate, isophorone-diisocyanate, triphenylmethane triisocyanate, products derived from the isocyanates and polyalcohol, and polyisocyanate prepared by condensation reaction of the isocyanates.

Examples of the polyurethanes include polyester-polyurethane, polyether-polyurethane, polycarbonate-polyurethane, polyester-polycarbonate-polyurethane, and polycaprolactone-polyurethane.

Preferably, the binder in the magnetic layer comprises a combination of polyurethane resin and at least one resin selected from the group consisting of vinyl chloride resin, vinyl chloride-vinyl acetate copolymer, vinyl chloride-vinyl acetate-vinyl alcohol copolymer, vinyl chloride-vinyl acetate-maleic anhydride and nitrocellulose. The binder may further contain a hardening agent such as polyisocyanates.

It is also preferred for the binder to have at least one polar group selected from the group consisting of —COOM, —SO$_3$M, —OSO$_3$M, —P=O(CM)$_2$, —O—P☉O(OM)$_2$ (in which M represents a hydrogen atom or an alkaline metal ion), —OH, —NR$_2$, —N$^+$R$_3$ (in which R represents a hydrocarbon group), epoxy group, —SH and —CN. These polar groups can be incorporated into the binder resin by copolymerization or addition reaction. The resin having the polar group disperses the ferromagnetic powder therein well, and improves the durability of the magnetic layer. The amount of the polar group preferably is in the range of $10^{-1}$ to $10^{-8}$ mol/g (more preferably $10^{-2}$ to $10^{-6}$ mol/g).

In the magnetic layer, the binder is generally contained in an amount of 5 to 50 weight parts (preferably 10 to 30 weight parts) based on 100 weight parts of the ferromagnetic powder. In the case where the magnetic layer contains, as the binder, a combination of one or more of the above vinyl chloride resins, polyurethane resin and polyisocyanate, the amounts of them preferably ar in the ranges of 5 to 70 wt. %, 2 to 50 wt. % and 2 to 50 wt. %, respectively.

The coating dispersion for preparing the magnetic layer may contain a dispersing agent so as to disperse well the ferromagnetic powder and carbon black. Further, other additives such as plasticizer, antistatic agent (electroconductive fine particles other than carbon black) and antiseptics may be optionally incorporated. Examples of the dispersing agents include fatty acid having 12–18 carbon atoms (represented by R—COOH in which R is an alkyl group or alkenyl group of 11–17 carbon atoms) such as caprylic acid, capric acid, lauric acid, myristic acid, palmitic acid, stearic acid, behenic acid, oleic acid, elaidic acid, linoleic acid, linolenic acid and stearolic acid; metallic soap derived from the above fatty acid and alkaline metal or alkaline earth metal; fluorine-containing ester of the above fatty acid; amide of the above fatty acid; polyalkyleneoxide alkylphosphate; lecithin; trialkylpolyolefinoxy quaternary ammonium salt (in which the alkyl group has 1–5 carbon atoms, and the olefin is, for example, ethylene or propylene); sulfates; and copper phthalocyanine. The above compounds may be employed singly or in combination. The dispersing agent is added in an amount of 0.5 to 20 weight parts based on 100 weight parts of the binder.

In the following description, the essentially non-magnetic layer is explained in more detail.

The non-magnetic layer comprises a non-magnetic powder and a binder, and is essentially non-magnetic. The non-magnetic layer is required to be non-magnetic in order not to reduce the electromagnetic characteristics of the magnetic layer provided thereon. However, if it does not give any adverse effect to the electromagnetic characteristics of the magnetic layer, the non-magnetic layer may contain a small amount of a magnetic powder. Generally, the non-magnetic layer further contains a lubricant.

The non-magnetic powder incorporated in the non-magnetic layer is, for example, a non-magnetic inorganic powder or carbon black. The non-magnetic powder preferably has Mohs' scale of hardness of 5 or more (more preferably 6 or more), and can be α-alumina, β-alumina, γ-alumina, silicone carbide, chromium oxide, cerium oxide, α-iron oxide, corundum, silicon nitride, titanium carbide, titanium dioxide, silicon dioxide, boron nitride, zinc oxide, calcium carbonate, calcium sulfate, or barium sulfate. These can be used singly or in combination. Preferred are titanium dioxide, α-alumina, α-iron oxide, and chromium oxide. The non-magnetic inorganic powder preferably has a mean particle size of 0.01 to 1.0 μm more preferably 0.01 to 0.5 μm, and most preferably 0.02 to 0.1 μm.

The carbon black imparts to the non-magnetic layer appropriate electroconductivity so as to prevent the layer from charging with electricity and further improves smoothness of the surface of the magnetic layer arranged thereon. Examples of carbon blacks for incorporation into the non-magnetic layer are those described hereinbefore for the magnetic layer. The particle size of carbon black for the non-magnetic layer preferably is not more than 35 mμ (more preferably in the range of 10 to 35 mμ). The carbon black can be incorporated into the non-magnetic layer in an amount of 3 to 20 weight parts, preferably 4 to 18 weight parts, more preferably 5 to 15 weight parts, based on 100 weight parts of the non-magnetic powder.

The non-magnetic layer may further contain a lubricant such as a fatty acid or a fatty acid ester. Examples of the lubricants employable for the non-magnetic layer are those described hereinbefore for the magnetic layer. The lubricant can be employed in an amount of 0.2 to 20 weight parts based on 100 weight parts of the non-magnetic powder in the non-magnetic layer.

The binder described hereinbefore for the magnetic layer can be also employed for the preparation of the non-magnetic layer. The non-magnetic layer can comprise the binder in an amount of 5 to 50 weight parts (preferably, 10 to 30 weight parts) based on 100 weight parts of the non-magnetic powder in the non-magnetic layer. In the case where the non-magnetic layer contains, as the binder, a combination of one or more of the above vinyl chloride resins, polyurethane resin and polyisocyanate, the amounts of them are preferably in the ranges of 5 to 70 wt. %, 2 to 50 wt. %, and 2 to 50 wt. %, respectively. The non-magnetic layer may further contain the optional components described hereinbefore.

The back-coating layer is described in more detail.

The back-coating layer mainly comprises carbon black, and preferably the carbon black comprises a combination of two kinds of carbon blacks having different mean particle sizes. One carbon black consists of relatively fine particles having a mean particle size of 10 to 30 m$\mu$ (carbon black I), and the other consists of relatively crude particles having a mean particle size of 150 to 300 m$\mu$ (carbon black II). The carbon black I having such a relatively small particle size imparts to the back-coating layer a low surface electric resistance. Moreover, the carbon black I having such a relatively small particle size can reduce a friction coefficient efficiently when it is employed in combination with a liquid lubricant, because the carbon black I having the small particle size can well retain the liquid lubricant on its surface. The carbon black II having a relatively large particle size can serve as solid lubricant and further form protrusions of small sizes on the surface of the back-coating layer. Such small size protrusions can reduce the total area of contact between the back-coating layer and the support members (for instance, guide poles) of the recording device. The reduced contact area results in reducing the friction coefficient between the back-coating layer and the support members.

The ratio of carbon black I to carbon black II preferably is 2/98 to 20/80, by weight, more preferably 4/96 to 15/85. The total amount of carbon blacks generally is in the range of 500 to 1,500 weight parts, preferably 800 to 1,200 weight parts, based on 100 weight parts of the binder of the back-coating layer. As the binder of the back-coating layer, known resins are employable. Preferably, a combination of nitrocellulose resin and polyester-polyurethane resin is employed.

In order to reinforce the back-coating layer and to enhance the running durability of the tape, the back-coating layer may contain an inorganic material powder having Mohs' scale of hardness of 5 to 9. The back-coating layer containing the inorganic powder together with the carbon black is deteriorated even if it is repeatedly used. Further, the inorganic material powder having Mohs' scale of hardness of 5 to 9 reduces wastes attaching to the supporting members (e.g., guide pole) with which the magnetic tape runs in contact, because the powder works as a moderate abrasive. The inorganic material powder preferably has a mean particle size of 0.01 to 1 $\mu$m (more preferably 0.05 to 0.5 $\mu$m, further preferably 0.08 to 0.3 $\mu$m). Examples of the inorganic material powders include $\alpha$-iron oxide, $\alpha$-alumina and chromium oxide ($Cr_2O_3$). These compounds may be used singly or in combination. Particularly, $\alpha$-iron oxide and $\alpha$-alumina are preferred. The amount of the inorganic material powder is preferably in the range of 0.01 to 5 weight parts, more preferably 0.05 to 2 weight parts, based on 100 weight parts of the carbon black.

The dispersing agents described for the magnetic layer are also employable for the back-coating layer. Copper oleate, copper phthalocyanine and barium sulfate are preferably employed in combination. The dispersing agent is added in an amount of 0.5 to 20 weight parts based on 100 weight parts of the binder.

The support is described in more detail.

As the material for the support of the invention, materials used for those of the conventional magnetic tapes are employable. Particularly, non-magnetic materials are preferred. Examples of the materials include polyesters (e.g., polyethylene terephthalate, polyethylene naphthalate, a mixture of polyethylene terephthalate and polyethylene naphthalate, copolymer comprising both ethylene terephthalate component and ethylene naphthalate), polyolefins (e.g., polypropylene), cellulose derivatives (e.g., cellulose diacetate, cellulose triacetate), polycarbonate, polyamides (e.g., aromatic polyamide, aramid), and polyimides (e.g., aromatic polyimide). Preferred is polyethylene terephthalate (PET). The thickness of the support is not particularly restricted, but preferably in the range of 2.0 to 7.5 $\mu$m (more preferably 3.0 to 7.0 $\mu$m, further preferably 4.5 to 6.5 $\mu$m).

The following is a brief description of the process for preparing the magnetic tape of the invention.

In a usual manner, the magnetic tape of the invention can be produced by the steps of forming the non-magnetic layer and the magnetic layer in order on one surface side of the support, and then forming the back-coating layer on the other surface side.

Preferably, the magnetic layer is prepared by the so-called "wet-on-wet process", in which the magnetic layer is formed on the non-magnetic layer while the non-magnetic layer is still wet. The wet-on-wet process is performed, for example, by applying the coating dispersion for preparing the magnetic layer onto the non-magnetic layer which is still wet.

A variety of procedures for conducting the wet-on-wet process are described in the following U.S. and Japanese patent publications:

1) U.S. Pat. No. 4,681,062, No. 4,480,583 and No. 5,302,206 for gravure coating, roller coating, blade coating, and extrusion coating;

2) U.S. Pat. No. 4,854,262, No. 5,030,484 and No. 5,302,206 for simultaneous coating by means of a coating device comprising two slits in a single coating head; and 3) Japanese Patent Provisional Publication No. 2(1990)-174965 for simultaneous coating by means of an extrusion coating device equipped with a back-up roller.

For preparation of the magnetic tape of the invention, the non-magnetic layer and the magnetic layer are preferably formed by simultaneous coating.

The magnetic layer thus formed preferably has a surface roughness (Ra) of 1 to 5 nm (more preferably 2 to 2.8 nm, further preferably 2.2 to 2.7 nm), which is determined by 3D-MIRAU (three-dimensional) method.

Preferably, the magnetic layer has a squareness ratio (SQ) of not less than 0.82 (more preferably not less than 0.85, further preferably not less than 0.88) in its longitudinal direction. The magnetic layer preferably has a switching field distribution (SFD) value of 0.1 to 0.32 (more preferably 0.15 to 0.28, further preferably 0.18 to 0.25). The value of SFD reflects the susceptibility to inverse magnetization, and the layer having a small SFD value is susceptible to inverse magnetization.

The surface state of the back-coating layer is often transferred onto that of the magnetic layer while the magnetic tape is stored in the form of a roll, and hence the back-coating layer preferably has a smooth surface. Preferably, the back-coating has a surface roughness (Ra) of 0.0030 to 0.060 $\mu$m (average roughness at the center of cut-off 0.08 mm). In the calender surface treatment performed after applying the coating solution, the surface roughness can be adjusted by selecting the material, the surface state and the pressure of the calender roll.

The thickness of the non-magnetic layer preferably is in the range of 0.2 to 3.0 $\mu$m (more preferably 1.0 to 2.5 $\mu$m), and the back-coating layer preferably has a thickness of 0.2 to 0.8 μm. Further, the magnetic tape of the invention preferably has a total thickness of 5 to 10 μm (more preferably 7 to 9.5 μm, further preferably 7.5 to 9.5 μm).

As described before, since the magnetic tape of the invention is preferably designed for the use with MR heads, it is advantageously used in a magnetic recording-reproducing system equipped with a MR head. In particular, the magnetic tape of the invention is suitable for computer data recording. There is no restriction with respect to the MR head employed in combination, and known MR heads are employable. Preferred is a MR head comprising a MR device (for example, comprising Fe/Ni permalloy film) of shield type or upright type with which the magnetic tape runs in contact.

The present invention is further described by the following examples and comparison examples. In these examples, "part(s)" means "part(s) by weight", unless otherwise specified.

EXAMPLE 1

[Coating Dispersions for Preparing Non-magnetic and Magnetic Layers]

(Components for the non-magnetic layer)

| | |
|---|---|
| Non-magnetic powder (titanium dioxide) (rutile type, $TiO_2$ content: higher than 90%, mean primary particle size: 0.035 μm, specific surface area (BET): 40 m$^2$/g, pH: 7.0 DBT (dibutyl phthalate) absorption: 27–38 g/100 g, Mohs' scale of hardness: 6.0 having a surface covered with 1.5 wt. % of $Al_2O_3$) | 90 parts |
| Carbon black (available from Mitsubishi Carbon Co., Ltd., mean primary particle size: 16 mμ, DBT absorption: 80 mL/100 g pH: 8.0 specific surface area (BET): 250 m$^2$/g, volatile content: 1.5%) | 10 parts |
| Vinyl chloride copolymer having the polar groups (-$SO_3K$, epoxy group) (MR-110, available from Nippon Zeon Co., Ltd.) | 12 parts |
| Polyester-polyurethane resin having the polar group (-$SO_3Na$) (neopentylglycol/caprolactone polyol/di-phenylmethane-4,4'-diisocyanate (MDI) = 0.9/2.6/1, weight ratio, content of -$SO_3Na$ group: $1 \times 10^{-4}$ mol/g) | 5 parts |
| Polyisocyanate (Colonate L, available from Nippon Polyurethane Industries, Ltd.) | 3 parts |
| Butyl stearate | 1 part |
| Stearic acid | 2 parts |
| Methyl ethyl ketone | 150 parts |
| Cyclohexanone | 50 parts |

(Components for the magnetic layer)

| | |
|---|---|
| Ferromagnetic metal powder (Fe:Co = 90:10 (atomic ratio); coercive force (Hc): 1850 Oe; specific surface area (BET): 58 m$^2$/g; crystallite size: 175 angstroms; saturation magnetization (σs): 130 emu/g; grain size (mean diameter along the major axis): 0.09 μm; aspect ratio: 7.0; pH: 8.6; water soluble Na: 70 ppm; water soluble Ca: 10 ppm; water soluble Fe: 10 ppm) | 100 parts |
| Vinyl chloride copolymer having the polar groups (-$SO_3K$) | 12 parts |

[Coating Dispersions for Preparing Non-magnetic and Magnetic Layers]

| | |
|---|---|
| (MR-110, available from Nippon Zeon Co., Ltd.; polymerization degree: 350; content of -$SO_3K$ group: $5 \times 10^{-6}$ mol/g; content of epoxy group: 3.5 wt. % in terms of monomer unit) | |
| Polyester-polyurethane resin having the polar group (-$SO_3Na$) (neopentylglycol/caprolactone polyol/MDI = 0.9/2.6/1, weight ratio, content of -$SO_3Na$ group: $1 \times 10^{-4}$ mol/g) | 3 parts |
| Polyisocyanate (Colonate L, available from Nippon Polyurethane Industries, Ltd.) | 3 parts |
| α-Alumina (particle size: 0.2 μm) | 5 parts |
| Carbon black (particle size: 0.08 μm) | 0.5 parts |
| Butyl stearate | 1 part |
| Stearic acid | 2 parts |
| Methyl ethyl ketone | 150 parts |
| Cyclohexanone | 50 parts |

All ingredients except the polyisocyanate of each layer were kneaded in a continuous kneader and dispersed in a sand mill. Each resulting dispersion was mixed with 3 parts of the polyisocyanate (Colonate L) and 40 parts of butyl acetate. The mixture was passed through a filter having a mean pore size of 1 μm, to give a coating dispersion for preparing each of a non-magnetic layer and a magnetic layer.

[Coating Dispersion for Preparing Back-Coating Layer]

(Components for the back-coating layer)

| | |
|---|---|
| Carbon black (primary mean particle size: 17 mμ; DBP absorption: 75 mL/100 g; pH: 8.0; specific surface area (BET): 220 m$^2$/g; volatile content: 1.5%; bulk density: 15 lbs/ft$^3$) | 100 parts |
| Nitrocellulose | 100 parts |
| Polyurethane resin (NIPPORAN [trade name], available from Nippon Polyurethane Industries Co., Ltd.) | 30 parts |
| Dispersant: copper oleate | 10 parts |
| copper phthalocyanine | 5 parts |
| barium sulfate (precipitated) | 5 parts |
| Methyl ethyl ketone | 500 parts |
| Toluene | 500 parts |

The above ingredients were preliminarily kneaded, and then further kneaded in a roll mill. To 100 parts of the obtained mixture, the following ingredients were added and dispersed in a sand grinder.

| | |
|---|---|
| Carbon black (primary mean particle size: 200 mμ; DBT absorption: 36 mL/100 g; pH: 8.5; specific surface area (BET): 200 m$^2$/g) | 100 parts |
| α-alumina (mean particle size: 0.2 μm) | 0.1 part |

The prepared dispersion was filtered, and then 120 parts of methyl ethyl ketone and 5 parts of polyisocyanate (Colonate L) were added to 100 parts of the dispersion. Thus, a coating dispersion for preparing the back-coating layer was prepared.

Preparation of Magnetic Tape for Computer Data Recording

The above-prepared coating dispersion for magnetic layer and that for non-magnetic layer were coated on a polyethylene terephthalate web (thickness: 6.0 μm, central surface roughness: 0.005 Am) by a simultaneous double coating method, to give a non-magnetic layer and a magnetic layer having thicknesses of 2.1 μm and 0.2 μm, respectively (in terms of thickness after dryness).

The coated layers were treated successively with a cobalt magnet having a magnetic flux density of 3,000 gauss and a solenoid having a magnetic flux density of 1,500 gauss for orientation while the layers were still wet. Thus treated layers were dried to give a non-magnetic layer and a magnetic layer placed thereon.

Subsequently, the above-prepared coating dispersion for the back-coating layer was coated on the surface of the web opposite to the surface on which the non-magnetic layer and the magnetic layer were provided, to give a back-coating layer having a thickness of 0.5 μm (in terms of thickness after dryness). Thus, a continuous magnetic recording web was produced in the form of a roll.

The continuous magnetic recording web was then subjected to calendaring (temperature: 90° C., linear pressure 300 kg/cm$^2$) by passing the web between six nips each of which comprises seven metal rollers. The calendared recording web was slit to give a magnetic tape having a width of 0.5 inch.

The magnetic tape was then encased in a ½ inch cartridge of the known IBM 3480 tape cartridge (tape length: 580 m).

EXAMPLES 2 TO 3

The procedures of Example 1 were repeated except for setting the thickness of the magnetic layer at 0.15 μm (Example 2) or 0.25 μm (Example 3), in terms of thickness after dryness, to produce the magnetic tapes of Example 2 or 3, respectively. Each tape was then encased in a ½ inch IBM 3480 tape cartridge (tape length: 580 m).

EXAMPLE 4

The procedures of Example 1 were repeated except for using the following ferromagnetic metal powder, to produce the magnetic recording tape. The produced tape was then encased in a ½ inch IBM 3480 tape cartridge (tape length: 580 m).

Ferromagnetic metal powder
(Fe: Co=90:10 (atomic ratio);
coercive force (Hc): 2000 Oe;
specific surface area (BET): 60 m$^2$/g;
crystallite size: 170 angstroms;
saturation magnetization (σs): 128 emu/g;
grain size (mean diameter along the major axis): 0.087 μm;
aspect ratio: 8.0;
pH: 8.3;
water soluble Na: 50 ppm;
water soluble Ca: 5 ppm;
water soluble Fe: 10 ppm)

EXAMPLE 5

The procedures of Example 1 were repeated except for using the following ferromagnetic metal powder, to produce the magnetic recording tape. The produced tape was then encased in a ½ inch IBM 3480 tape cartridge (tape length: 580 m).

Ferromagnetic metal powder
(Fe: Co=80:20 (atomic ratio);
coercive force (Hc): 1700 Oe;
specific surface area (BET): 53 m$^2$/g;
crystallite size: 190 angstroms;
saturation magnetization (σs): 128 emu/g;
grain size (mean diameter along the major axis): 0.10 μm;
aspect ratio: 8.0;
pH: 8.3;
water soluble Na: 60 ppm;
water soluble Ca: 1 ppm;
water soluble Fe: 13 ppm)

EXAMPLE 6

The procedures of Example 1 were repeated except that the coated layers were treated with a cobalt magnet having a magnetic flux density of 1,500 gauss and a solenoid having a magnetic flux density of 1,000 gauss for orientation while the layers were still wet, to produce the magnetic recording tape. The produced tape was then encased in a ½ inch IBM 3480 tape cartridge (tape length: 580 m).

COMPARISON EXAMPLE 1

The procedures of Example 1 were repeated except for setting the thickness of the magnetic layer at 0.30 μm in terms of thickness after dryness, to produce the magnetic tapes. The tape was then encased in a ½ inch IBM 3480 tape cartridge (tape length: 580 m).

COMPARISON EXAMPLE 2

The procedures of Example 1 were repeated except for using the following ferromagnetic metal powder, to produce the magnetic recording tape. The produced tape was then encased in a ½ inch IBM 3480 tape cartridge (tape length: 580 m).

Ferromagnetic metal powder
(Fe: Co=80:20 (atomic ratio);
coercive force (Hc): 2400 Oe;
specific surface area (BET): 61 m$^2$/g;
crystallite size: 160 angstroms;
saturation magnetization (σs): 135 emu/g;
grain size (mean diameter along the major axis): 0.08 μm;
aspect ratio: 6.0;
pH: 8.3;
water soluble Na: 20 ppm;
water soluble Ca: 0 ppm;
water soluble Fe: 8 ppm)

COMPARISON EXAMPLE 3

The procedures of Example 1 were repeated except for using the following ferromagnetic metal powder, to produce the magnetic recording tape. The produced tape was then encased in a ½ inch IBM 3480 tape cartridge (tape length: 580 m).

Ferromagnetic metal powder
(Fe : Co=80: 20 (atomic ratio);
coercive force (Hc): 2,100 Oe;

specific surface area (BET): 57 m²/g;
crystallite size: 170 angstroms;
saturation magnetization (σs): 130 emu/g;
grain size (mean diameter along the major axis): 0.09 μm;
aspect ratio: 7.0;
pH: 8.3;
water soluble Na: 25 ppm;
water soluble Ca: 2 ppm;
water soluble Fe: 12 ppm)

COMPARISON EXAMPLE 4

The procedures of Example 1 were repeated except for changing the amounts of the ingredients in the magnetic layer as follows, to produce the magnetic recording tape. The produced tape was then encased in a ½ inch IBM 3480 tape cartridge (tape length: 580 m).

| | |
|---|---|
| Vinyl chloride copolymer having the polar groups (-SO₃K) (MR-110, available from Nippon Zeon Co., Ltd.; polymerization degree: 350; content of -SO₃K group: 5 × 10⁻⁶ mol/g; content of epoxy group: 3.5 wt. % in terms of monomer unit) | 10 parts |
| Polyester-polyurethane resin having the polar group (-SO₃Na) (neopentylglycol/caprolactone polyol/MDI = 0.9/2.6/1, weight ratio, content of -SO₃Na group: 1 × 10⁻⁴ mol/g) | 2 parts |
| Polyisocyanate (Colonate L, available from Nippon Polyurethane Industries, Ltd.) | 2 parts |
| α-Alumina (particle size: 0.2 μm) | 3 parts |

COMPARISON EXAMPLE 5

The procedures of Example 1 were repeated except for setting the thickness of the magnetic layer at 0.05 μm in terms of thickness after dryness, to produce the magnetic tapes. The tape was then encased in a ½ inch IBM 3480 tape cartridge (tape length: 580 m).

COMPARISON EXAMPLE 6

The procedures of Example 1 were repeated except that only the magnetic layer (thickness: 2.0 μm) was formed and that the layer was treated with a cobalt magnet having a magnetic flux density of 3,000 gauss and a solenoid having a magnetic flux density of 1,500 gauss for orientation while the layer was still wet, to produce the magnetic recording tape. The produced tape was then encased in a ½ inch IBM 3480 tape cartridge (tape length: 580 m).

COMPARISON EXAMPLE 7

The procedures of Comparison Example 6 were repeated except for using the following ferromagnetic metal powder, to produce the magnetic recording tape. The produced tape was then encased in a ½ inch IBM 3480 tape cartridge (tape length: 580 m).

Ferromagnetic metal powder
(Fe: Co=90:10 (atomic ratio);
coercive force (Hc): 1,650 Oe;
specific surface area (BET): 46 m²/g;
crystallite size: 220 angstroms;
saturation magnetization (σs): 122 emu/g;
grain size (mean diameter along the major axis): 0.18 μm;
aspect ratio: 9.0;
pH: 8.0;
water soluble Na: 50 ppm;
water soluble Ca: 8 ppm;
water soluble Fe: 30 ppm)

COMPARISON EXAMPLE 8

The procedures of Comparison Example 6 were repeated except for using the following ferromagnetic $CrO_2$ powder, to produce the magnetic recording tape. The produced tape was then encased in a ½ inch IBM 3480 tape cartridge (tape length: 580 m).

Ferromagnetic $CrO_2$ powder
(coercive force (Hc): 499 Oe;
specific surface area (BET): 24.1 m²/g;
saturation magnetization (σs): 78 emu/g)

Magnetic Recording-Reproducing System (1) Thin-film magnetic heads
a) recording head
structure: inductive head comprising 2-turn thin-film coil provided between amorphous Co magnetic thin-film yokes
track width: 66 μm
gap length: 1.4 μm
b) reproducing head
structure: shunt bias magnetoresistive reproducing head having double shields
track width: 22 μm
shield length: 0.45 μm (2) Composition of system The above-identified heads were incorporated into a recording-reproducing apparatus (F613A drive [trade name], available from Fujitsu, Ltd.) which is ½ inch IBM 3480 tape drive, to compose a recording-reproducing system (tape speed: 40 inches/second).

Evaluation of Magnetic Tape

The magnetic tapes prepared above were evaluated in the the following characteristics.

(1) Coercive force (Hc) of ferromagnetic powder, and magnoetic flux (Φm), switching field distribution (SFD) value and squareness ratio (SQ) of magnetic layer These values were measured under the magnetic field (Hm) of 5 kOe by means of a flux meter (available from Toei-kogyo Co., Ltd.).

(2) Surface Roughness (Ra)

In accordance with 3D-MIRAU, the central surface roughness (Ra) [sample area: 250×250 μm] was measured by means of TOPO3D (available from WYKO).

(3) Thickness of Magnetic Layer

The sample tape was cut into fragments (thickness: approx.0.1 μm), and the fragment was then observed and photographed through a transmission electron microscope. Based on the obtained picture, the thickness of the magnetic layer was measured by means of IBASII image processing apparatus.

(4) Total Thickness of Magnetic Tape

Ten magnetic tapes were superposed, and the thickness of the superposed tapes was measured using a micrometer (available from Mitsutoyo co., Ltd.) to determine the total thickness of the magnetic tape.

(5) Electromagnetic Conversion Characteristics of Magnoetic Tape

The following characteristics were measured in the above recording-reproducing system.

a) overwriting (O/W)

A signal having a wavelength of 2.1 μm was recorded on the magnetic tape, and then another signal having a wavelength of 0.5 μm was overwritten on the tape. Subsequently, the residual magnetism of the signal of 2.1 μm wavelength was measured.

b) output power

The output power was measured when a signal having a wavelength of 0.54 μm was reproduced.

c) S/N ratio

The difference between the output power of the signal of wavelength 0.54 μm and that of the signal of wavelength 1.2 μm was measured.

d) $PW_{50}$

The half width of the solitary reproduced inverse waveform derived from the signal of wavelength 7.89 μm beforehand recorded was measured. Generally, the half width of the solitary reproduced inverse waveform reflects the recording unit length. The smaller the half width is, the shorter the recording unit is. Therefore the magnetic tape exhibiting a small half width can densely record the date.

The results are shown in Table 1.

TABLE 1

Example 1

| | |
|---|---|
| thickness of magnetic layer (μm): | 0.2 |
| ferromagnetic powder Hc (Oe): | 1850 |
| magnetic flux of magnetic layer (Φm): | 0.07 |
| SFD of magnetic layer: | 0.22 |
| squareness ratio (SQ) of magnetic layer: | 0.9 |
| roughness (Ra) of magnetic layer (nm): | 2.5 |
| total thickness of tape (μm): | 8.8 |
| Characteristics | |

| | | | |
|---|---|---|---|
| S/N (dB): | 17 | $PW_{50}$ (nm): | 317 |
| O/W (dB): | −33.5 | output power (μm): | 290 |

Example 2

| | |
|---|---|
| thickness of magnetic layer (μm): | 0.15 |
| ferromagnetic powder Hc (Oe): | 1850 |
| magnetic flux of magnetic layer (Φm): | 0.06 |
| SFD of magnetic layer: | 0.22 |
| squareness ratio (SQ) of magnetic layer: | 0.9 |
| roughness (Ra) of magnetic layer (nm): | 2.5 |
| total thickness of tape (μm): | 8.75 |
| Characteristics | |

| | | | |
|---|---|---|---|
| S/N (dB): | 16.5 | $PW_{50}$ (nm): | 300 |
| O/W (dB): | −35 | output power (μm): | 270 |

Example 3

| | |
|---|---|
| thickness of magnetic layer (μm): | 0.25 |
| ferromagnetic powder Hc (Oe): | 1850 |
| magnetic flux of magnetic layer (Φm): | 0.085 |
| SFD of magnetic layer: | 0.22 |
| squareness ratio (SQ) of magnetic layer: | 0.9 |
| roughness (Ra) of magnetic layer (nm): | 2.5 |
| total thickness of tape (μm): | 8.85 |
| Characteristics | |

| | | | |
|---|---|---|---|
| S/N (dB): | 17.5 | $PW_{50}$ (nm): | 330 |
| O/W (dB): | −31 | output power (μm): | 310 |

Example 4

| | |
|---|---|
| thickness of magnetic layer (μm): | 0.2 |
| ferromagnetic powder Hc (Oe): | 2000 |
| magnetic flux of magnetic layer (Φm): | 0.09 |
| SFD of magnetic layer: | 0.22 |

TABLE 1-continued

| | |
|---|---|
| squareness ratio (SQ) of magnetic layer: | 0.9 |
| roughness (Ra) of magnetic layer (nm): | 2.5 |
| total thickness of tape (μm): | 8.8 |
| Characteristics | |

| | | | |
|---|---|---|---|
| S/N (dB): | 17.5 | $PW_{50}$ (nm): | 305 |
| O/W (dB): | −31 | output power (μm): | 270 |

Example 5

| | |
|---|---|
| thickness of magnetic layer (μm): | 0.2 |
| ferromagnetic powder Hc (Oe): | 1700 |
| magnetic flux of magnetic layer (Φm): | 0.065 |
| SFD of magnetic layer: | 0.22 |
| squareness ratio (SQ) of magnetic layer: | 0.9 |
| roughness (Ra) of magnetic layer (nm): | 2.5 |
| total thickness of tape (μm): | 8.8 |
| Characteristics | |

| | | | |
|---|---|---|---|
| S/N (dB): | 16 | $PW_{50}$ (nm): | 330 |
| O/W (dB): | −34 | output power (μm): | 270 |

Example 6

| | |
|---|---|
| thickness of magnetic layer (μm): | 0.2 |
| ferromagnetic powder Hc (Oe): | 1850 |
| magnetic flux of magnetic layer (Φm): | 0.07 |
| SFD of magnetic layer: | 0.3 |
| squareness ratio (SQ) of magnetic layer: | 0.75 |
| roughness (Ra) of magnetic layer (nm): | 2.3 |
| total thickness of tape (μm): | 8.8 |
| Characteristics | |

| | | | |
|---|---|---|---|
| S/N (dB): | 16 | $PW_{50}$ (nm): | 350 |
| O/W (dB): | −33 | output power (μm): | 280 |

Comparison Example 1

| | |
|---|---|
| thickness of magnetic layer (μm): | 0.3 |
| ferromagnetic powder Hc (Oe): | 1850 |
| magnetic flux of magnetic layer (Φm): | 0.12 |
| SFD of magnetic layer: | 0.23 |
| squareness ratio (SQ) of magnetic layer: | 0.91 |
| roughness (Ra) of magnetic layer (nm): | 2.4 |
| total thickness of tape (μm): | 8.9 |
| Characteristics | |

| | | | |
|---|---|---|---|
| S/N (dB): | 14 | $PW_{50}$ (nm): | 380 |
| O/W (dB): | −29 | output power (μm): | 330 |

Comparison Example 2

| | |
|---|---|
| thickness of magnetic layer (μm): | 0.2 |
| ferromagnetic powder Hc (Oe): | 2400 |
| magnetic flux of magnetic layer (Φm): | 0.16 |
| SFD of magnetic layer: | 0.24 |
| squareness ratio (SQ) of magnetic layer: | 0.88 |
| roughness (Ra) of magnetic layer (nm): | 2.2 |
| total thickness of tape (μm): | 8.8 |
| Characteristics | |

| | | | |
|---|---|---|---|
| S/N (dB): | 13 | $PW_{50}$ (nm): | 280 |
| O/W (dB): | −24 | output power (μm): | 200 |

Comparison Example 3

| | |
|---|---|
| thickness of magnetic layer (μm): | 0.2 |
| ferromagnetic powder Hc (Oe): | 2100 |
| magnetic flux of magnetic layer (Φm): | 0.12 |
| SFD of magnetic layer: | 0.23 |
| squareness ratio (SQ) of magnetic layer: | 0.89 |
| roughness (Ra) of magnetic layer (nm): | 2.4 |
| total thickness of tape (μm): | 8.8 |
| Characteristics | |

| | | | |
|---|---|---|---|
| S/N (dB): | 14 | $PW_{50}$ (nm): | 300 |
| O/W (dB): | −28 | output power (μm): | 220 |

Comparison Example 4

| | |
|---|---|
| thickness of magnetic layer (μm): | 0.2 |
| ferromagnetic powder Hc (Oe): | 1850 |
| magnetic flux of magnetic layer (Φm): | 0.13 |
| SFD of magnetic layer: | 0.22 |
| squareness ratio (SQ) of magnetic layer: | 0.87 |

TABLE 1-continued

| | | | |
|---|---|---|---|
| roughness (Ra) of magnetic layer (nm): | | | 2.8 |
| total thickness of tape (μm): | | | 8.8 |
| Characteristics | | | |
| S/N (dB): | 12 | $PW_{50}$ (nm): | 400 |
| O/W (dB): | −33 | output power (μm): | 280 |

Comparison Example 5

| | |
|---|---|
| thickness of magnetic layer (μm): | 0.05 |
| ferromagnetic powder Hc (Oe): | 1850 |
| magnetic flux of magnetic layer (μm): | 0.016 |
| SFD of magnetic layer: | 0.3 |
| squareness ratio (SQ) of magnetic layer: | 0.83 |
| roughness (Ra) of magnetic layer (nm): | 2.9 |
| total thickness of tape (μm): | 8.65 |
| Characteristics | |

| | | | |
|---|---|---|---|
| S/N (dB): | 9 | $PW_{50}$ (nm): | 220 |
| O/W (dB): | −39 | output power (μm): | 110 |

Comparison Example 6

| | |
|---|---|
| thickness of magnetic layer (μm): | 2.0 |
| ferromagnetic powder Hc (Oe): | 1850 |
| magnetic flux of magnetic layer (Φm): | 0.7 |
| SFD of magnetic layer: | 0.3 |
| squareness ratio (SQ) of magnetic layer: | 0.88 |
| roughness (Ra) of magnetic layer (nm): | 2.3 |
| total thickness of tape (μm): | 8.5 |
| Characteristics | |

| | | | |
|---|---|---|---|
| S/N (dB): | 13 | $PW_{50}$ (nm): | 820 |
| O/W (dB): | −20 | output power (μm): | 340 |

Comparison Example 7

| | |
|---|---|
| thickness of magnetic layer (μm): | 2.0 |
| ferromagnetic powder Hc (Oe): | 1650 |
| magnetic flux of magnetic layer (Φm): | 0.6 |
| SFD of magnetic layer: | 0.4 |
| squareness ratio (SQ) of magnetic layer: | 0.92 |
| roughness (Ra) of magnetic layer (nm): | 3.0 |
| total thickness of tape (μm): | 8.5 |
| Characteristics | |

| | | | |
|---|---|---|---|
| S/N (dB): | 11 | $PW_{50}$ (nm): | 711 |
| O/W (dB): | −22 | output power (μm): | 310 |

Comparison Example 8

| | |
|---|---|
| thickness of magnetic layer (μm): | 2.0 |
| ferromagnetic powder Hc (Oe): | 500 |
| magnetic flux of magnetic layer (Φm): | 0.5 |
| SFD of magnetic layer: | 0.6 |
| squareness ratio (SQ) of magnetic layer: | 0.9 |
| roughness (Ra) of magnetic layer (nm): | 6.5 |
| total thickness of tape (μm): | 8.5 |
| Characteristics | |

| | | | |
|---|---|---|---|
| S/N (dB): | 8 | $PW_{50}$ (nm): | 1100 |
| O/W (dB): | −24 | output power (μm): | 120 |

The results set forth in Table 1 indicate the following facts.

The samples according to the invention (each of Examples 1 to 5), in which the magnetic layer has a thickness of 0.08 to 0.28 μm and a magnetic flux of 0.02 to 0.1 G·cm, does not make the MR head saturated, and gives a high S/N value. This means that the magnetic tape of the invention has excellent electromagnetic characteristics. Further, the samples of the invention exhibit low $PW_{50}$ values. This fact suggests that the magnetic tape of the invention can gives high density recording. Therefore the results in the Table 1 tell that the magnetic tape according to the invention is very suitably employable for a magnetic recording-reproducing system equipped with a MR head. Although the magnetic tape of ample 6 gives a relatively low SQ value and a relatively large $PW_{50}$ value as compared with other magnetic tapes of the invention, such values are practically acceptable.

On the other hand, since the magnetic tape of Comparison Example 1 has a thick magnetic layer, the magnetic flux of the magnetic layer is so large that the MR head is saturated. As the result, it gives a low S/N value and a large $PW_{50}$ value. Further, the sample of Comparison Example 1 exhibits a high O/W vales, and reproduces signals in distorted waveforms to increase the error rate. The magnetic tapes of Comparison Examples 2 and 3 exhibit poor characteristics in terms of output power and overwrite, and particularly the magnetic tape of Comparison Example 2 gives a very poor S/N value. The reason of this result is presumed as follows. Since these tapes comprise the ferromagnetic powders having a high coercive force, the recording head is liable to produce heat to give adverse effects to the MR head, and accordingly the electric resistance varies to cause noises. Further, the ferromagnetic powder having high coercive force often makes the MR head saturated.

In the magnetic tape of Comparison Example 4, the magnetic layer contains the ferromagnetic powder at a high density. Hence, the magnetic layer has a high magnetic flux which lowers the S/N and $PW_{50}$ values. In contrast, the magnetic tape of Comparison Example 5 has a very thin magnetic layer, and accordingly the magnetic flux of the magnetic layer is too small. Consequently, the tape of Comparison Example 5 gives a low output power, and reproduces signals in distorted waveforms to increase the error rate.

Since each of the magnetic tapes of Comparison Examples 6 to 8 comprises a magnetic layer having a single layer structure, they exhibit too high magnetic fluxes, too large $PW_{50}$ values and too poor characteristics in the overwriting. This means that they are by no means advantageously employed for a magnetic recording-reproducing system equipped with a MR head.

What is claimed is:

1. A magnetic recording tape comprising a support, and on one side of the support, a non-magnetic layer comprising a non-magnetic powder and a binder, and a magnetic layer comprising a ferromagnetic powder and a binder superposed in order, and on the other side, a back-coating layer containing carbon black, wherein said magnetic layer has a thickness in the range of 0.08 to 0.28 μm and a magnetic flux in the range of 0.02 to 0.1 G·cm.

2. The magnetic tape of claim 1, wherein said ferromagnetic powder has a coercive force in the range of 1,680 to 2,050 Oe.

3. The magnetic tape of claim 1, wherein said magnetic layer has a switching field distribution value in the range of 0.1 to 0.32.

4. The magnetic tape of claim 1, wherein said magnetic layer has a squareness ratio of more than 0.82 in its longitudinal direction.

5. The magnetic tape of claim 1, wherein said tape has a total thickness in the range of 5 to 10 μm.

6. In a magnetic recording system comprising the steps of recording magnetic signals in a magnetic recording tape and detecting said magnetically recorded signals in said magnetic tape with a magnetoresistive reproducing head, the improvement in that said magnetic recording tape comprises a support having first and second major surfaces, said first major surface having a non-magnetic layer containing a non-magnetic powder and a binder in order, and said second major surface having a back-coating layer containing carbon black, and a magnetic recording layer having a thickness in the range of 0.08 to 0.28 μm and a magnetic flux in the range of 0.02 to 0.1 G·cm.

* * * * *